United States Patent
Hussain

[15] 3,681,495
[45] Aug. 1, 1972

[54] FREEZE DRIED ECHOTHIOPHATE IODIDE COMPOSITIONS

[72] Inventor: Anwar A. Hussain, Plattsburgh, N.Y.

[73] Assignee: American Home Products Corporation, New York, N.Y.

[22] Filed: Aug. 25, 1969

[21] Appl. No.: 852,882

[52] U.S. Cl. .................424/211, 424/317, 260/945
[51] Int. Cl. .............................................A01n 17/00
[58] Field of Search ...............424/211, 317; 260/945

[56] References Cited

UNITED STATES PATENTS 2,911,430   11/1959   Fitch.............................260/945

Primary Examiner—Stanley J. Friedman
Attorney—Vito Victor Bellino, Andrew Kafko, Joseph Martin Weigman, Dwight J. Potter and Robert Wiser

[57] ABSTRACT

A process for producing echothiophate iodide of satisfactory stability so that potency is retained upon storage which involves freeze drying a solution of echothiophate iodide in a suitable solvent, for example water. It is preferred to have potassium acetate present during the lyophilization as the presence of this salt as a co-drying agent results in an echothiophate iodide product of very high stability. Under certain circumstances other co-drying agents may be present either in place of, or along with, the potassium acetate.

2 Claims, No Drawings

FREEZE DRIED ECHOTHIOPHATE IODIDE COMPOSITIONS

BACKGROUND OF THE INVENTION

This invention is concerned with the preparation of lyophilized echothiophate iodide intended for ophthalmic use and possessing adequate stability for this purpose. More particularly, this invention relates to stabilization of echothiophate ophthalmic preparations which, when reconstituted with a diluent, contain at least 0.03 percent weight per volume of echothiophate iodide. These preparations are intended for human use in the treatment of chronic simple, non-congestive glaucoma and in aphakic and other secondary glaucomas.

Echothiophate iodide, also known as Phospholine iodide, may be chemically identified as (2-mercaptoethyl) trimethylammonium iodide 0,0-diethyl phosphorothioate. It is disclosed in Fitch U.S. Pat. No. 2,911,430 and may be chemically represented as follows:

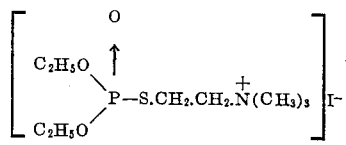

Echothiophate iodide, a cholinesterase inhibitor, may be indicated in chronic, non-congestive glaucoma with an elevated intraocular pressure. It may be prescribed advantageously twice a day at a concentration of 0.03 to 0.06 percent for cases of early simple glaucoma that appear to be controlled with pilocarpine. Because of its prolonged action, the idea of round-the-clock control may thus be approached more closely. It may also be used successfully in the treatment of advanced glaucoma, at concentrations of 0.125 to 0.25 percent, especially in cases that have not been controlled on a combination of miotics, sympathomimetics and carbonic anhydrase inhibitors.

Suitable ophthalmic preparations must possess pharmaceutical elegance, must be well tolerated by the patient, must be effective and must possess adequate physical and chemical stability.

Hussain et al., reported in *Journal Pharm. Science*, Vol. 57, page 411, March 1968, have studied the kinetics of degradation of echothiophate iodide in aqueous solutions as a function of pH and temperature. These investigators have found that echothiophate iodide in solution is relatively unstable. At 25° C. and pH 2.4 to 5.6, the half-life was found to be approximately 200 days, and it has been found that stability decreases drastically above pH 5.6. Thus, at pH 5.6 and at 25° C. the compound loses about 10 percent of its original concentration in a one month period.

As a result of this instability in solution, the drug is marketed in dry form, as a blend with mannitol, to be reconstituted just prior to use. Although this dry powder blend possesses adequate stability, numerous disadvantages are associated with it. Among these, the following may be mentioned:

a. Toxicity

As echothiophate iodide is a cholinesterase inhibitor, it will react with this chemical in the body when inhaled or absorbed into the body. The resulting abnormal accumulation of the byproduct, acetylcholine, gives rise to both muscarine and nicotinic effects. As the drug is accumulative, these effects, in sufficient concentration will lead to eventual paralysis of the respiratory system and death.

Therefore, elaborate precautions must be exercised to prevent inhalation or direct skin contact, with all personnel involved in handling the drug, i.e., manufacture of raw material, storage, transferring from containers for laboratory assay, weighing, blending, and of course, during final filling, labeling and shipping. With powdered materials such as echothiopate iodide dusting is always a problem especially during blending and filling operations, and thus operating personnel are exposed to the drug many times during the course of a work day.

b. Uniformity

As the stability of echothiophate iodide is adversely affected by the presence of trace amounts of moisture, extreme precautions in drying and handling the raw material or blends of it are required. All handling, blending, filling and sealing cycles must be performed in low humidity atmospheres; such practices being expensive.

It is well known in the art that extremely dry materials tend to accumulate static charges during handling, such charges being almost impossible to prevent or to reduce once obtained. Such charged particles can adhere to equipment walls, or to each other, and may lead to non-uniformity in a mixture of two chemicals. This occurs with the echothiophate iodide-mannitol mixture, making both uniform blending and filling extremely difficult.

When one understands that extreme potency variation in individual pharmaceutical dosage forms is not tolerated by United States Law, the problems encountered in this area can be appreciated.

c. Particulate Matter

Ophthalmic preparations should contain amounts of fibers, dirt, insoluble matter and other extraneous materials in minimal amounts so that damage to the eye can be avoided. While great care is taken at present to obtain a clean product, it is virtually impossible under present manufacturing procedures to accomplish this. As one can well imagine, absolutely particle-free air is difficult to obtain in areas where heavy equipment is utilized.

d. Sterility

As echothiophate iodide is an ophthalmic preparation it should be sterile. Although many drugs may be sterilized by the use of steam, dry heat or gas, echothiophate iodide will degrade even in dry form under the conditions of heat and moisture used for these conventional sterilization procedures. Thus, echothiophate iodide and mannitol must be prepared in a sterile manner. They must then be stored and transferred under sterile conditions. The blending and filling operations must be carried out using sterile techniques. As those versed in the art can recognize, such procedures are costly and the risk of microbial contamination is always present as a result of the human factor or of equipment failure.

SUMMARY OF INVENTION

We have now found that solutions of echothiophate iodide may be lyophilized successfully. More particularly, we have found that solutions containing both echothiophate iodide and a chemical additive can be lyophilized, resulting in an echothiophate iodide dosage form possessing adequate stability.

Lyophilization, also called "freeze-drying," is a process in which a solution of a solid in a solvent, commonly water, is frozen, and the solvent evaporated (sublimed) under vacuum while the system is in the frozen state. The resulting dry material usually can be made to form a cake which is firm and will not dust.

In the field of pharmaceuticals this is of great advantage, as the drug solution can be filtered free of particulate matter just prior to freezing, can be rendered sterile, if necessary, through this filtration and, further, can be filled and lyophilized in the final container. Should the system be a true solution, as is the case with echothiophate iodide, where the solids are distributed uniformly throughout the liquid phase, uniformity of fill and potency can be controlled. The usual machines used for filling liquids are relatively accurate (to ±0.05 percent). As the handling of dry powders is reduced to the single operation of preparing the solution, the hazards of inhalation and of skin contact of dusts are markedly reduced.

Thus, objectionable features of the present method of manufacture of dosage forms of echothiophate, namely toxicity through handling, non-uniformity, sterility, and particulate matter, are greatly reduced or overcome in the lyophilization process. This process therefore offers great advantages over the present one, particularly in reducing the toxic hazards involved.

Echothiophate iodide may be freeze-dried by itself and the resulting dried product possesses adequate stability. For example 90 percent of potency is retained after 3 days at 60° C. However, especially with the lower dosage forms (1.5 mg. and 3.0 mg. per 5 ml. vial) the resultant product is difficult to discern because of the relatively small amount of residual product compared to the surface area of the vial. Thus, an inspector or dispensing pharmacist would find it difficult to determine that the bottle contained any product. Therefore, especially for these lower dosage forms, it was necessary to bulk the dosage form with a compatible, pharmaceutically acceptable chemical. Mannitol, and the sodium salts of many acids, such as the sodium salts of hydrochloric, maleic, succinic, fumaric and acetic acids, were tested as co-drying agents in the lyophilizing process. Dry stability of these mixtures showed that after three or four days at 60° C. only 41 to 69 percent of the original potency was retained.

However, when potassium acetate as a co-drying agent is utilized, it was found that potency was retained at about 90 percent after four days at 60° C. and, even after 8 days at 60° C., the potency was still about 70 percent.

As stated earlier echothiophate iodide is very moisture sensitive. While not intending to be bound by any reason for this increased stability, it probably results from the fact that potassium acetate, while very hygroscopic, will release all its bound and free water very readily at relatively low temperatures. On the other hand, mannitol and sodium acid salts, in general, are difficult to render completely anhydrous except under somewhat drastic conditions.

It has further been found that the amount of potassium acetate necessary is important, especially in the lyophilization of the higher potency dosage forms (6.25 and 12.5 mg.) of echothiophate iodide. This is probably due to the necessity in these dosage forms of maintaining a minimal weight relationship between the solids. For example, when 20 mg. of potassium acetate per vial is present, 80 to 90 percent of potency will be retained after 3 days at 60° C. (depending upon the echothiophate iodide content), while with 40 mg. per vial, 85 to 95 percent of the potency will be retained under the same conditions. While 40 mg. per vial (to be reconstituted with 5 ml. of diluent) is sufficient in the case of the higher dosage forms presently marketed, within the scope of this invention it is understood that amounts up to 250 mg. for reconstitution to 5 ml. might be utilized. In a pharmaceutical preparation, such as echothiophate iodide, the amount used would be the upper limit of tonicity of the solution. Tonicity refers to the osmotic pressure of a liquid. A liquid adjusted to the osmotic pressure of the body fluids or another liquid is deemed to be isotonic. A solution which has a lower osmotic pressure than another solution is deemed hypotonic, while one with higher pressure is deemed hypertonic.

All body fluids exert osmotic pressure, so that a solution intended for injection, or one for application to delicate membranes, should be adjusted to approximately the same pressure, as impairment of the body tissue may otherwise result. It is generally recognized that concentration of salts for ophthalmic solution use may be two or three times, or more, without adverse effect upon the eye. Such adjustment of pressure may be accomplished by the addition of salts such as sodium chloride, a 0.9 percent solution of which is considered to be isotonic with body fluids. Other salts, for instance potassium acetate, can be utilized and the amount required easily calculated. (See Husa's *Pharmaceutical Dispensing*, Chapters 10 and 15.)

We have also found that the cycle used during the lyophilization process influences the stability of the product. Maximum stability is obtained when the drying cycle affords a "film" type product rather than a "cake" as conventionally obtained in freeze-drying. The formation of this type of product is a function of temperature during the drying cycle, greater stability being afforded by higher temperatures.

It has been demonstrated the echothiophate iodide of varying potencies can be successfully lyophilized to afford a product possessing adequate stability. Further, the process of lyophilization decreases the hazards, to manufacturing personnel, of contact with the potentially toxic drug. It also increases the potential for the production of pharmaceutical dosage forms of echothiophate iodide of uniform fill and potency, which contain a minimum amount of undesirable particulate matter. Uniformity of the resulting product, from batch to batch, is improved. The possibility of a market product being contaminated with microorganisms is much reduced where lyophilization is utilized, as a result of the positive control of sterility and less exposure during the manufacturing cycles.

While echothiophate iodide alone can be lyophilized, without the presence of any added agent to the solution, to provide an adequately stable product, ordinarily, because of the relatively very small amounts of the salt involved in dosage forms, it is usually desirable to use a pharmaceutically approved chemical to furnish bulk. The pharmacist or quality control inspector will therefore be provided visual proof that product is present in the freeze-dried vials.

While numerous chemicals may be used for this bulking process, potassium acetate is the one that is preferred. Other chemicals tested tend to reduce the stability of echothiophate iodide to a point where it is doubtful that a marketable product could be produced. The use of potassium acetate, on the other hand, results in a marketable product possessing stability equal to, or better than, the dry fill process. Rabbit eye irritation tests performed in our laboratories with reconstituted product containing potassium acetate demonstrated that this salt was non-irritating. The dosage forms containing potassium acetate have also been found to possess patient acceptability and product efficiency.

What is claimed is:

1. A process of preparing stable solid echothiophate iodide which comprises subjecting to lyophilization an aqueous solution containing about 1.5 to about 12.5 parts by weight of echothiophate iodide per 20 to 250 parts by weight of potassium acetate.

2. A stable, solid echothiophate iodide preparation comprising a lyophilized admixture of from about 1.5 to about 12.5 parts by weight of echothiophate iodide and 20 to 250 parts by weight of potassium acetate.

* * * * *